United States Patent [19]

Sundermann et al.

[11] 4,031,067
[45] June 21, 1977

[54] POLYTRIAZINES AND A PROCESS FOR THEIR PRODUCTION

[75] Inventors: Rudolf Sundermann, New Martinsville, W. Va.; Günther Rottloff, Cologne; Ernst Grigat, Odenthal-Gloebusch, both of Germany

[73] Assignee: Bayer Aktiengesellschaft, Germany

[22] Filed: July 22, 1976

[21] Appl. No.: 707,552

[30] Foreign Application Priority Data

July 24, 1975 Germany .......................... 2533126

[52] U.S. Cl. .......................... 260/77.5 R; 252/182; 260/30.4 N; 260/31.2 N; 260/32.6 N; 260/32.8 N; 260/33.2 R; 260/33.6 UB; 260/33.8 UB; 428/423
[51] Int. Cl.² ................. C08G 18/00; C08G 18/71
[58] Field of Search ........ 252/182; 260/2 R, 77.5 R

[56] References Cited

UNITED STATES PATENTS 3,423,333  10/1976  Stackman et al. ............ 260/77.5 R

*Primary Examiner*—H.S. Cockeram
*Attorney, Agent, or Firm*—Connolly and Hutz

[57] ABSTRACT

Mixtures of aliphatic, cycloaliphatic or aromatic polyfunctional N-cyanosulfon amides and aromatic polyfunctional cyanic acid ester are converted at 30° to 150° C into fusible prepolymers or prepolymers soluble in organic solvents (polymeric N-organo-isourea ethers). Said prepolymers are highly stable in storage and react at 150° – 350° C to high molecular weight polymers of of triazine structure which are insoluble in solvents and infusible. The prepolymers may be used for the production of coatings or shaped articles or laminates.

2 Claims, No Drawings

POLYTRIAZINES AND A PROCESS FOR THEIR PRODUCTION

This invention relates to high molecular weight polytriazines and to a process for their production by heat-treating soluble, polymeric N-cyano-isourea ethers which have in turn been obtained by the polyaddition of polyfunctional N-cyano-sulphonamides and polyfunctional aromatic cyanic acid esters.

It is known from DT-PS No. 1,190,184 that high molecular weight polytriazines can be obtained by polymerising difunctional or polyfunctional aromatic cyanic acid esters at elevated temperature, optionally in the presence of polymerisation promoters.

In addition, it is known from Japanese Application JA 6265/66 that primary diamines can be reacted with cyanogen halide to form di(cyanamides) which may be processed into polymers.

The polymerisation of polyfunctional cyanamides of secondary amines with catalytic to more than molar quantities of mono- or poly-hydroxyl and/or thiol compounds at temperatures of from 50° to 250° C to form polymeric products, in also known, cf. DT-OS No. 1,595,651.

Finally, a process for the production of macromolecular polyguanidines by reacting N,N'-dicyanamides of the formula NC—NH—R—NH—CN on their own or with an N,N'-dicyanamide of the formula NC—N—R'—R—NR'CN (where R and R' represent hydrocarbon radicals), is known from NE-PS No. 55 826.

It has now been found that high molecular weight polytriazines can be obtained by converting N-cyanosulphonamides corresponding to the general formula (I):

$$A(SO_2-NH-CN)_n \qquad (I)$$

in which
  A represents aliphatic, cycloaliphatic or aromatic polyvalent radicals, optionally interrupted by bridge members, and
  $n$ is a number from 2 to 5,
with polyfunctional aromatic cyanic acid esters corresponding to the general formula (II):

$$Ar(OCN)_m \qquad (II)$$

in which
  Ar represents an aromatic radical or an aromatic radical interrupted by bridge members, and
  $m$ is a number from 2 to 5,
at elevated temperatures into a prepolymer which is soluble in organic solvents or into a fusible prepolymer (polymeric N-cyano-isourea ether), and allowing the prepolymer to react to completion at elevated temperatures to form a high molecular weight polymer of polytriazine structure which is substantially insoluble in solvents.

It is preferred to react from 30 to 70 mol % of N-cyanosulphonamides of the formula (I) with from 70 to 30 mol % of aromatic cyanic acid esters corresponding to the formula (II).

The invention also relates to mixtures which can be converted into high molecular weight polymers of polytriazine structure that are substantially insoluble in solvents, comprising
  A. N-cyanosulphonamides corresponding to the general formula (I):

$$A(SO_2-NH-CN)_n \qquad (I)$$

in which
  A represents an aliphatic, cycloaliphatic or aromatic radical optionally interrupted by bridge members, and
  $n$ is a number from 2 to 5, and
  B. aromatic cyanic acid esters corresponding to the general formula (II):

$$Ar(OCN)_m \qquad (II)$$

in which
  Ar represents an aromatic radical or an aromatic radical interrupted by bridge members, and
  $m$ is a number from 2 to 5.

The mixtures preferably consist of from 30 to 70 mol % of N-cyanosulphonamides corresponding to the formula (I) and of from 70 to 30 mol % of aromatic cyanic acid esters corresponding to the formula (II).

The process according to the invention may be illustrated, for example, by the following equation ($x > 2$), the terminal groups being cyanamide and cyanate groups:

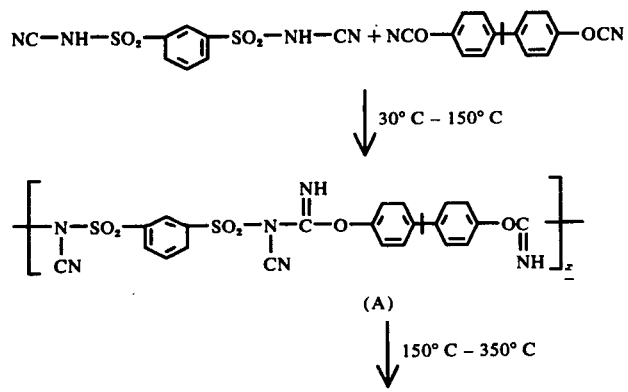

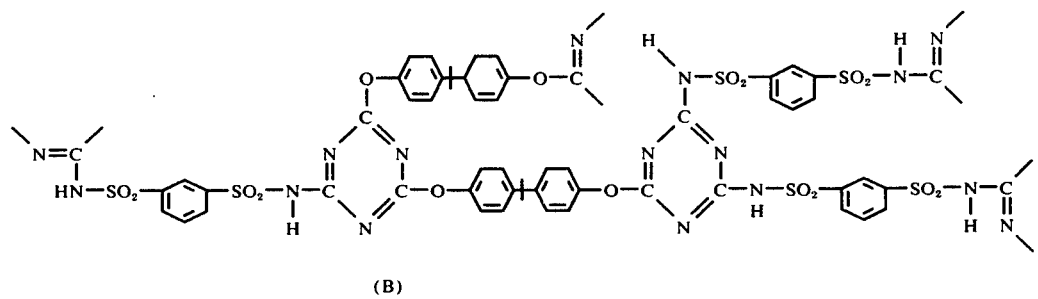

(B)

In formula (I), A preferably represents a polyvalent aliphatic, straight-chain or branched-chain, saturated or unsaturated radical with from 1 to 20 carbon atoms, more especially with from 2 to 12 carbon atoms; a polyvalent cyclo-aliphatic radical with from 4 to 12 carbon atoms, more especially a 5-membered or 6-membered cycloaliphatic polyvalent radical; a polyvalent cycloaliphatic radical with from 4 to 12 and more especially with from 5 to 10 carbon atoms interrupted by $C_1$–$C_4$ alkylene groups or by phenyl or by heteroatoms (O or S); a polyvalent aromatic radical with from 6 to 14 carbon atoms, more especially with from 6 to 10 carbon atoms; one polyvalent aromatic ring with 6 to 14 carbon atoms, more especially with 6 carbon atoms, interrupted by $C_1$ to $C_4$ alkylene, by oxygen by the carbonyl group (—CO—), by the carbonyl dioxy group

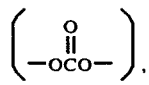

by the sulphonyl group (—$SO_2$—), or two such rings interrupted by a cycloaliphatic or aromatic 5-membered or 6-membered carbocyclic ring or by a single bond; and n is preferably the number 2 or 3, more especially the number 2.

N-Cyanosulphonamides of the formula (I) in which A represents the aromatic radicals defined above are particularly preferred.

The following compounds are mentioned as examples of compounds corresponding to the formula (I):

hexane-di-(sulphonylcyanamide)-1,6 and isomers;
benzene-di(sulphonylcyanamide)-1,3; -1,4;
benzene-tri-(sulphonylcyanamide)-1,3,5;
naphthalene-di-(sulphonylcyanamide)-1,3 and isomers;
naphthalene-tri-(sulphonylcyanamide)-1,3,5; -1,3,6; -1,3,7;
naphthalene-tetra-(sulphonylcyanamide)-1,3,5,7;
diphenyl-di-(sulphonylcyanamide)-2,2'; -4,4'; -3,3'; -2,4';
diphenyl methane-di-(sulphonylcyanamide)-4,4'; -2,4';
diphenyl dimethyl methane-di-(sulphonylcyanamide)-4,4' and isomers;
diphenyl sulphone-di-(sulphonylcyanamide)-3,3' and isomers;
benzophenone-di-(sulphonylcyanamide)-3,3' and isomers;
diphenyl ether-di-(sulphonylcyanamide)-4,4' and isomers; and
cyclohexane-di-(sulphonylcyanamide).

In the context of the invention, isomers are position isomers.

The N-cyanosulphonamides of the formula (I) used in accordance with the invention may be obtained by reacting the corresponding sulphonic acid chlorides with cyanamide in accordance with Schotten-Baumann (cf. Methoden der Organischen Chemie, Houben-Weyl, fourth Edition, Vol. 8, page 177) or in accordance with Herbenstreit (J. Pr.[2], Vol. 41, pages 99 and 105). These compounds may also be prepared by reacting the corresponding sulphonamides with cyanogen halide in the presence of bases at temperatures of up to 65° C.

The aromatic cyanic acid esters of the formula (II) used in accordance with the invention are known compounds, for example from GB-PS No. 1,007,790, and may be obtained by the process described therein.

From 1 to 1.1 mol of cyanogen halide and 1 mol of a base or base mixture may be used for every phenolic hydroxyl group. The reaction temperatures may be in the range of from −40° to +65° C. Suitable bases are inorganic bases, such as sodium hydroxide, potassium hydroxide, soda, potash, calcium hydroxide or tertiary amines, such as trimethyl amine or triethyl amine, whilst suitable solvents or suspending agents are water, alcohols, ketones, hydrocarbons chlorinated hydrocarbons or mixtures thereof.

The aromatic cyanic acid esters preferably correspond to the general formula (III):

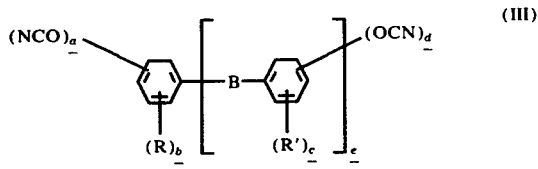

in which
R represents hydrogen, halogen, linear or branched $C_1$ – $C_9$ alkyl or phenyl, several radicals R not having to be the same, or two adjacent radicals R on the same nucleus together form a carbocyclic 5-membered or 6-membered ring or together and in conjunction with a hetero atom (O, S or N) form a 5-membered or 6-membered heterocyclic ring, alkoxy radicals with from 1 to 4 carbon atoms, or alkoxy carbonyl radicals with from 1 to 4 carbon atoms in the alkyl groups;
R' has the same meaning as R or represents the group (IV):

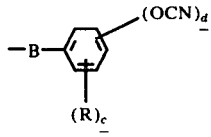

(IV)

B represents a single bond, an alkylene group with from 1 to 9 carbon atoms optionally substituted by $C_1$–$C_4$ alkyl or phenyl, a cycloaliphatic or aromatic 5-membered or 6-membered ring optionally interrupted by oxygen, oxygen, the sulphonyl group ($-SO_2-$), the carbonyl dioxy group

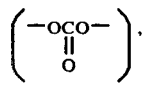

or the carbonyl group;
$a$ is a number from 0 to 5 where $e = 1$, and a number from 2 to 5 where $e = 0$;
$b = 5 - a$ where $e = 1$, and $6 - (a + d)$ where $e = 0$;
$c = 5 - d$;
$d$ is a number from 0 to 5;
$e = 0$ or 1;
with the proviso that the sum of $a$ and $d$ always gives a number from 2 to 5.

The symbols in formula (II) have the following meanings in particular:

R = hydrogen, chlorine or bromine, $C_1$–$C_4$ alkyl, methoxy, ethoxy, methoxy carbonyl, ethoxy carbonyl or butoxy carbonyl;

B = a single bond, oxygen, the sulphonyl group, the carbonyl group, the carbonyl dioxy group, the methylene, ethylene or 2,2-propylene group

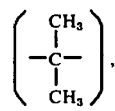

or the cyclohexylene radical;
$a$ = the number 1 where $e = 1$, and the number 2 where $e = 0$;
$b$ = the number 1 or 2, more especially the number 1;
$c$ = the number 1 or 2, more especially the number 1;
$d$ = the number 0 or 1, and
$e$ = the number 0 or 1,
with the proviso that $a + d = 2$.

The following are mentioned as examples of compounds which correspond to the formula (II); the di- and poly-cyanic acid esters, 1,3- and 1,4-dicyanato benzene, 2-tert-butyl-1,4-dicyanatobenzene, 2,4-dimethyl-1,3-dicyanatobenzene, 2,5-di-tert.-butyl-1,4-dicyanatobenzene, tetramethyl-1,4-dicyanatobenzene, 2,4,6-trimethyl-1,3-dicyanatobenzene, 4-chloro-1,3-dicyanatobenzene, 1,3-, 1,4-, 1,5-, 1,6-, 1,7-, 1,8-, 2,6- 2,7-dicyanatonaphthalene and 1,3,5-tricyanatobenzene;

4,4′-dicyanatodiphenyl, 2,2′-dicyanatodiphenyl,3,3′, 5,5′-tetramethyl-4,4′-dicyanatodiphenyl, 3,3′, 5,5′-tetrachloro-4,4′-dicyanatodiphenyl, 3,3′, 5,5′-tetrachloro-2,2′-dicyanatodiphenyl, 2,2′, 6,6′-tetrachloro-4,4′-dicyanatodiphenyl, 4,4′-bis-[(3-cyanato)-phenoxy]-diphenyl, 4,4′-bis-[(4-cyanato)-phenoxy]-diphenyl; 2,2′-dicyanato-1,1′-binaphthyl; 4,4′-dicyanatodiphenyl ether, 3,3′, 5,5′-tetramethyl-4,4′-dicyanatodiphenyl ether, 3,3′, 5,5′-tetrachloro-4,4′-dicyanatodiphenyl ether, 4,4′-bis-[p-cyanatophenoxy]-diphenyl ether, 4,4′-bis-[p-cyanatophenyl isopropyl]diphenyl ether, 4,4′-bis-[p-cyanatophenoxy]-benzene, 4,4′-bis-[m-cyanatophenoxy]-diphenyl ether, 4,4′-bis-[4-(4-cyanatophenoxy)-phenyl sulphone]-diphenyl ether; 4,4′-dicyanatodiphenyl sulphone, 3,3′, 5,5′-tetramethyl-4,4′-dicyanato diphenyl sulphone, 3,3′,5,5′-tetrachloro-4,4′-dicyanatodiphenyl sulphone, 4,4′-bis-[p-cyanatophenyl isopropyl]-diphenyl sulphone, 4,4′-bis-[(4-cyanato)-phenoxy]-diphenyl sulphone, 4,4′-bis-[(3-cyanato)-phenoxy]-diphenyl sulphone, 4,4′-bis-[4-(4-cyanatophenyl isopropyl)-phenoxy]-diphenyl sulphone, 4,4′-bis-[4-(4-cyanatophenyl sulphone)-phenoxy]diphenyl sulphone, 4,4′-bis-[4-(4-cyanato)-diphenoxy]diphenyl sulphone;

4,4′-dicyanatodiphenyl methane, 4,4′-bis-[p-cyanatophenyl]diphenyl methane, 2,2-bis-(p-cyanatophenyl)-propane, 2,2-bis-(3,5-dimethyl-4-cyanatophenyl)-propane, 2,2-bis-(3,5-dichloro-4-cyanatophenyl)-propane, 1,1-bis-[p-cyanato phenyl]-cyclohexane, bis-[2-cyanato-1-naphthyl]-methane, 1,2-bis-[p-cyanatophenyl]-1,1,2,2-tetramethyl ethane, 4,4′-dicyanatobenzophenone, 4,4′-bis-(4-cyanato)-phenoxy benzophenone, 1,4-bis-[p-cyanatophenylisopropyl]-benzene, 2,2′, 5,5′-tetracyanatodiphenyl sulphone; and polycyanic acid esters of novolaks (reaction products of phenol or alkyl- or halogen-substituted phenols with formaldehyde in acid solution) containing from 3 to 5 OCN groups.

In cases where it is desired to use particularly pure aromatic cyanic acid esters which are highly stable in storage, it is advisable to adopt a procedure similar to that described in German Patent Applications, our co-pending U.S. application Ser. Nos. 658,814 or 658,815 which relates to the production of highly pure polyfunctional cyanic acid esters. According to our copending U.S. application Ser. No. 658,814, filed Feb. 17, 1976 di- or polytrialkyl ammonium phenolates (for example polytriethyl-ammonium phenolates) are reacted with an excess of a cyanogen halide in an organic solvent, optionally in the presence of catalytic quantities of trialkyl amines, such as triethyl amine, to form the corresponding aromatic cyanic acid esters.

According to our copending U.S. application Ser. No. 658,815, filed Feb. 17, 1976, alkali or alkaline earth metal salts, preferably sodium, potassium, calcium and barium salts of aromatic dihydroxy or polyhydroxy compounds, are reacted with a cyanogen halide in a solvent, optionally in the presence of catalytic quantities of a tertiary amine.

From 1 to 2 mols and preferably from 1 to 1.4 mols of cyanogen halide and from 1 to 1.8 mols, preferably from 1 to 1.3 mols, of a base or base mixture may be used for every phenolic hydroxyl group, the base or the base mixture always being used in a deficit relative to the cyanogen halide.

Examples of suitable solvents are water; lower aliphatic alcohols such as methanol, ethanol, propanol, isopropanol or butanol; aliphatic ketones such as acetone, methyl ethyl ketone, diethyl ketone, methyl isopropyl ketone or methyl isobutyl ketone; aliphatic or aromatic hydrocarbons, preferred aliphatic hydrocarbons being the fractions accumulating during distillation of naturally occurring mixtures, such as petroleum ether, light petrol or petrol, whilst examples of aromatic hydrocarbons are benzene, toluene and xylenes; aliphatic and aromatic chlorinated hydrocarbons, such as dichloromethane, dichloroethane, perchloroethylene, chlorobenzene or dichlorobenzene; ethers such as diethyl ether, diisopropyl ether, dioxane, teterahydrofuran or di-sec.-butyl ether; nitro hydrocarbons such as nitromethane, nitrobenzene or nitrotoluene; amides such as dimethyl formamide or dimethyl acetamide; and mixtures thereof.

Suitable inorganic or organic bases are those mentioned in GB-PS No. 1,007,790.

These processes are generally carried out at temperatures in the range of from −40° to +65° C and preferably at temperatures in the range of from 0° to 30° C. In cases where cyanogen chloride is used, the reaction is preferably carried out below the boiling point (13° C), although where cyanogen bromide is used the reaction may even be carried out at temperatures above 50° C.

Tertiary amines, which are used in catalytic quantities (0.001 to 10% by weight, more especially 0.001 to 1.0% by weight, based on alkali or alkaline earth phenolate) in accordance with our copending U.S. application Ser. No. 658,815, filed Feb. 17, 1976 corresponding to the general formula:

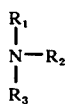

in which $R_1$, $R_2$, $R_3$ = alkyl, aryl and cycloalkyl radicals, which do not have to be the same as one another, with from 1 to 36 carbon atoms, more especially with up to 18 carbon atoms, such as for example trimethyl amine, triethyl amine, methyl diethyl amine, tripropyl amine, tributyl amine, methyl dibutyl amine, dinonyl methyl amine, dimethyl stearyl amine, dimethyl cyclohexyl amine and diethyl aniline.

The process according to the invention may be carried out by reacting the polyfunctional N-cyanosulphonamides and the polyfunctional aromatic cyanic acid esters by heating to about 30° – 150° C, preferably to 50° – 100° C, optionally in solution and optionally in the presence of a catalyst or catalyst mixture, to form uncrosslinked prepolymers (A) which are soluble in organic solvents. The prepolymers represent polymeric N-cyano-isourea ethers of wax-like or solid consistency and are soluble in organic solvents. They are highly stable in storage. As shown by the IR-spectrum, they contain hardly any triazine structures, but instead show the bands of the

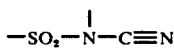

group at 4.4 μ and the band of the

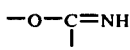

group at 5.9 μ.

The prepolymers may be converted into high molecular weight polymers (B) of triazine structure by heating to about 150°–350° C, preferably to 150° – 300° C, optionally in solution and optionally in the presence of a catalyst or catalyst mixture. The end products are substantially insoluble in solvents and are infusible. As shown by the infrared spectrum, the polymer does not contain any other crosslinking principles apart from triazine structures. The formation of the high molecular weight polymers with triazine structures indicates that the cyanic acid ester and cyanamide groups have participated equally in formation of the triazine ring.

Catalysts suitable for use in the production of the prepolymer and high molecular weight end polymer with triazine structures include acids, bases, salts, nitrogen and phosphorus compounds, for example Lewis acids such as $AlCl_3$, $BF_3$, $FeCl_3$, $TiCl_4$, $ZnCl_2$ or $SnCl_4$, proton acids such as HCl or $H_3PO_4$; aromatic hydroxy compounds such as phenol, p-nitrophenol, pyrocatechol or dihydroxy naphthalene; sodium hydroxide, sodium methylate, sodium phenolate, trimethyl amine, triethyl amine, tributyl amine, diazabicyclo-(2,2,2)-octane, quinoline, isoquinoline tetrahydroisoquinoline, tetraethyl ammonium chloride, pyridine-N-oxide, tributyl phosphine, phospholine-$\Delta^3$-1-oxa-1-phenyl, zinc octoate, tin octoate, zinc naphthenate, and mixtures thereof.

The catalysts may be used in quantities of from 0.001% by weight to 10% by weight, based on the prepolymer, or if desired in even larger quantities.

The prepolymers may be used in solution in inert solvents, such as acetone, benzene, xylene, chlorobenzene, ethyl acetate, tetrahydrofuran, dibutyl ether or dimethyl formamide, or in powder form, for the production of coatings on substrates such as metals, ceramics, glass, earthenware, etc., or in solution in organic solvents as impregnating lacquers or laminating resins. If desired, the prepolymers may be combined with fillers, pigments, glass fibres, metal fibres and glass cloths and used for the production of shaped articles or laminates. Yellow to brown, transparent, extremely hard and temperature-resistant end products are obtained after hardening.

The polytriazines may even be formed in a single stage without isolating the prepolymers.

The percentages and parts quoted in the following Examples relate to weight, unless otherwise indicated.

EXAMPLE 1

28.6 g (0.1 mol) of benzene-di-(sulphonyl-cyanamide)-1,3 and 27.8 g (0.1 mol) of bis-2,2-(4-cyanatophenyl)propane are heated for 3 hours to 70° C in 200 ml of isopropanol. A polymeric N-sulphonyl-N-cyanoisourea ether with the characteristic IR-bands at 4.4 μ

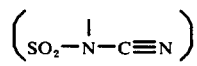

and 5.9 μ

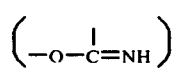

is obtained in a quantitative yield following removal of the solvent.

15 g of the polymeric N-cyanoisourea ether are heated under nitrogen for 7 hours to 280°–300° C. A brown, very hard polymer with the IR-bands characteristic of the s- triazine ring at 6.4 and 7.25 μ is obtained after cooling. The bands typical of the prepolymer at 4.4 μ and 5.9 μ are no longer present in the reaction product.

EXAMPLE 2

20 g (0.07 mol) of benzene-di-(sulphonyl-cyanamide)-1,3 and 50 g (0.18 mol) of bis-2,2-(4-cyanatophenyl)propane are boiled under reflux for 4 hours in 300 ml of toluene. A polymeric N-cyanoisourea ether containing cyanic acid ester is obtained in a quantitative yield following removal of the solvent. (IR-spectrum, N—C ≡ N at 4.4 μ, O—C ≡ N at 4.5 μ, < C = NH at 5.9 μ). Hardening of this wax-like prepolymer takes place over a period of 5 hours at 180°-200° C in the presence of 0.1 % of zinc octoate. A yellow coloured extremely hard polytriazine is obtained (s-triazine band in the IR-spectrum at 6.4 μ and 7.25 μ).

EXAMPLE 3

36.2 g (0.1 mol) of diphenyl-di-(sulphonyl-cyanamide)-4,4' and 16 g (0.1 mol) of resorcinol dicyanate are boiled under reflux for 3 hours in 200 ml of methyl ethyl ketone. A polymeric N-cyanoisourea ether is obtained in a quantitative yield following removal of the solvent. (IR-spectrum:

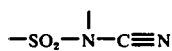

at 4.4 μ,

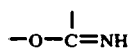

at 5.9 μ). Hardening of this prepolymer into a polytriazine takes place over a period of 4 hours at 180° C following the addition of 0.2% of pyrocatechol and 0.2% of diaza-bicyclo-(2,2,2)-octane.

EXAMPLE 4

37.8 g (0.1 mol) of diphenyl ether-di-(sulphonyl-cyanamide)-4,4' and 23.6 g (0.1 mol) of 1,4-dicyanatodiphenyl are boiled under reflux for 3 hours in 250 ml of dichloroethane. A polymeric N-cyano-isourea ether having characteristic IR-bands at 4.4 μ and 5.9 μ is obtained following removal of the solvent. Hardening into a brown-coloured, extremely hard polytriazine takes place over a period of 3 hours at 170° C in the presence of 0.1% of zinc chloride.

EXAMPLE 5

50 g (0.1175 mol) of diphenyl sulphone-di-(sulphonyl cyanamide)-3,3' and 40 g (0.1333 mol) of 1,4-dicyanato diphenyl sulphone are boiled under reflux for 4 hours in 300 ml of isopropanol. A prepolymer having the IR-bands at 4.4 μ (—N—C ≡ N), 4.5 μ (—O—C ≡ N) and 5.9 μ

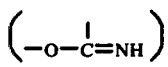

is obtained in a quantitative yield following removal of the solvent. Hardening into an extremely hard polytriazine takes place over a period of 4 hours at 200° C in the presence of 0.2% of zinc octoate.

EXAMPLE 6

33.6 g (0.1 mol) of naphthaline-di-(sulphonyl-cyanamide)-1,5 and 33.4 g (0.1 mol) of bis-2,2-(3,5-dimethyl-4-cyanatophenyl)-propane are boiled under reflux for 3 hours in 250 ml of isopropanol. A polymeric N-cyanoisourea ether (IR: band at 4.4 μ

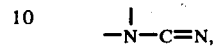

at 5.9 μ

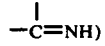

is obtained in a quantitative yield following removal of the solvent. Hardening into an extremely hard polytriazine takes place over a period of 5 hours at 160° C in the presence of 0.1% of tin tetrachloride.

EXAMPLE 7

33.6 g (0.1 mol) of naphthalene-di-(sulphonyl-cyanamide)-2,6 and 21.0 g (0.1 mol) of 1,5-dicyanatonaphthalene are boiled under reflux for 2.5 hours in dichloropropane. A polymeric N-cyano-isourea ether (IR-spectrum:

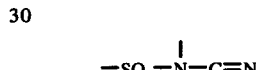

at 4.4 μ,

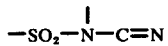

at 5.9 μ) is obtained following removal of the solvent. Hardening into an extremely hard, brown-coloured polytriazine takes place over a period of 4 hours at 200° C in the presence of 0.1% of tin octoate.

EXAMPLE 8

28.6 g (0.1 mol) of benzene-di-(sulphonyl-cyanamide)-1,3 and 13.3 g (0.066 mol) of 1,3,5-tricyanatobenzene are boiled under reflux for 3 hours in 150 ml of isopropanol. A polymeric N-cyano-isourea ether is obtained in a quantitative yield following removal of the solvent. (IR-spectrum:

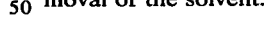

at 4.4 μ,

at 5.9 μ). Hardening of this prepolymer to form the extremely hard, brittle polytriazine takes place over a period of 5 hours at 210° C in the presence of 0.2 % by weight of zinc octoate.

We claim:

1. A mixture which can be converted into a high molecular weight polymer of polytriazine structure which is substantially insoluble in solvents comprising I. 30 to 70 mol percent of an N-cyanosulphonamide corresponding to the formula $$A(SO_2-NH-CN)_n$$

wherein A is an aliphatic, cycloaliphatic or aromatic polyvalent radical and $n$ is a number from 2 to 5, II. 70 to 30 mol percent of an aromatic cyanic acid ester corresponding to the formula $$Ar(OCN)_m$$

wherein Ar is an aromatic radical or an aromatic radical interrupted by bridge members, and $m$ is a number from 2 to 5.

2. A process for the production of a high molecular weight polymer of polytriazine structure which is substantially insoluble in solvents by poly-trimerization at elevated temperatures wherein from 30 to 70 mol percent of an N-cyanosulphonamide corresponding to the formula $$A(SO_2-NH-CN)_n$$

wherein A is an aliphatic, cycloaliphatic or aromatic polyvalent radical and $n$ is a number from 2 to 5, is reacted with a polyfunctional aromatic cyanic acid ester corresponding to the formula $$Ar(OCN)_m$$

wherein Ar is an aromatic radical or an aromatic radical interrupted by bridge members and $m$ is a number from 2 to 5, at elevated temperatures to form a prepolymer soluble in organic solvents or a fusible polymeric N-cyano-isourea ether prepolymer and the formed prepolymer is allowed to react to completion at elevated temperature to form a high molecular weight polymer of polytriazine structure which is substantially insoluble in solvents.

* * * * *